United States Patent [19]
Wiley

[11] 3,783,154
[45] Jan. 1, 1974

[54] PRODUCTION OF CITRIC ACID
[75] Inventor: Richard H. Wiley, New York, N.Y.
[73] Assignee: Miles Laboratories, Inc., Elkhart, Ind.
[22] Filed: June 28, 1971
[21] Appl. No.: 157,650

[52] U.S. Cl.... 260/535 P, 260/348.5 L, 260/537 R, 260/632 R
[51] Int. Cl............................................. C07c 59/16
[58] Field of Search...................... 260/535 P, 484 P

[56] References Cited
FOREIGN PATENTS OR APPLICATIONS
213,637  6/1956  Australia........................ 260/484 P OTHER PUBLICATIONS
Payne & Williams, Journal of Organic Chemistry Vol. 24, 1959, pg. 54–55.

Primary Examiner—Lorraine A. Weinberger
Assistant Examiner—Paul J. Killos
Attorney—Joseph C. Schwalbach et al.

[57] ABSTRACT

Citric acid can be produced by reacting maleic acid, fumaric acid, maleic anhydride or esters of maleic acid with a peroxide compound and then heating the resulting reaction mixture. Citric acid can then be recovered from the resulting products.

3 Claims, No Drawings

PRODUCTION OF CITRIC ACID

BACKGROUND AND PRIOR ART

Citric acid is a well-known item of commerce. It is generally produced by the selective fermentation of carbohydrates. Various organic syntheses of citric acid have been proposed, but these syntheses have usually involved expensive reactants and extreme reaction conditions which render them non-competitive commercially with the fermentation process. There is thus a need for an inexpensive non-fermentation organic synthesis of citric acid.

SUMMARY OF THE INVENTION

In accordance with the present invention a process for the production of citric acid is provided which comprises reacting a material selected from the class consisting of maleic acid, fumaric acid, maleic anhydride and esters of maleic acid with a peroxide compound and then heating the resulting reaction mixture.

DESCRIPTION OF THE INVENTION

The raw materials for this process, maleic acid, fumaric acid, maleic anhydride or esters of maleic acid, are items of commerce and are prepared by well-known procedures.

In carrying out the process of the present invention the raw material is reacted with a peroxide compound, such as hydrogen peroxide or t-butylhydroperoxide, in a suitable solvent and the resulting reaction mixture is then heated to form citric acid. The preferred peroxide material is t-butylhydroperoxide which forms t-butyl alcohol as a useful by-product. Water, t-butyl alcohol, methanol, ethyl ether, tetrahydrofuran, and the peroxide solutions are examples of suitable solvents. When maleic anhydride is a raw material, there must be sufficient water in the solvent system to convert substantially all of the maleic anhydride to maleic acid.

It is also preferred that this reaction be carried out in the presence of a transition metal catalyst, such as sodium tungstate, vanadium oxyacetyl acetonate, molybdenum oxide, tungstic acid, chromium acetyl acetonate and the like.

The overall reaction should be carried out at a temperature above about 40° C. The useful temperature range is from about 40° C. to about 175° C. The preferred temperature range is from about 75° C. to about 150° C.

While not intending to be limited thereby, it is believed that the reaction mechanism whereby citric acid is prepared involves the intermediate production of epoxysuccinic acid which in turn undergoes a self-catalyzed rearrangement to oxalacetic acid, condensation and degradation. Citric acid can then be recovered from the reaction mixture by leaching with water and then crystallization from the aqueous solution. Other recovery techniques can be used, such as precipitation as the calcium salt and then acidification of such salt.

This novel process has the commercial advantages of employing readily available and relatively inexpensive reaction conditions. It also has the unobvious feature of being capable of proceeding substantially directly from the raw material to citric acid in the same reaction vessel and with the initial reaction mixture.

The invention will be described in further detail in the following example.

EXAMPLE

A mixture of 1.16 g. of maleic acid, 1.2 ml. of t-butylhydroperoxide and 0.01 g. of vanadium oxyacetyl acetonate was warmed slowly to 80° – 90° C. and refluxed at 90° C. for about 10 minutes. The lower layer of the reaction mixture was assayed for citric acid content by thin layer chromatography using a silica gel plate and a butanol-formic acid mixture for development. A spot having an Rf value of 0.69 was obtained indicating the presence of citric acid, since a citric acid control produced an Rf value of 0.67 under the same conditions. The yield of citric acid was estimated as 85 percent based on the above assay results.

What is claimed is:

1. A process for the production of citric acid which comprises reacting a material selected from the class consisting of maleic acid, fumaric acid, maleic anhydride and esters of maleic acid with a peroxide compound and then heating the resulting reaction mixture at a temperature from about 75° to about 150° C.

2. A process according to claim 1 wherein the peroxide compound is t-butylhydroperoxide.

3. A process according to claim 1 wherein the reaction with the peroxide compound takes place in the presence of a transition metal catalyst.

* * * * *